United States Patent [19]

Mihara

[11] Patent Number: 4,999,732
[45] Date of Patent: Mar. 12, 1991

[54] DEGAUSSING CIRCUIT FOR CRT

[75] Inventor: Masahito Mihara, Yokaichi, Japan

[73] Assignee: Murata Manufacturing Co., Ltd., Japan

[21] Appl. No.: 269,917

[22] Filed: Nov. 10, 1988

[30] Foreign Application Priority Data

Nov. 13, 1987 [JP] Japan .............................. 62-174157[U]

[51] Int. Cl.$^5$ .............................................. H01J 29/00
[52] U.S. Cl. ......................................... 361/150; 315/8
[58] Field of Search ............................. 315/8; 361/150

[56] References Cited

U.S. PATENT DOCUMENTS

| 3,617,800 | 11/1971 | Ishikaw et al. | 361/150 |
| 4,024,427 | 5/1977 | Belhomme | 361/150 |
| 4,164,775 | 8/1979 | Slegers et al. | 361/150 |
| 4,636,911 | 1/1987 | Truskalo | 361/150 |
| 4,737,881 | 4/1988 | Haferl | 361/150 |

FOREIGN PATENT DOCUMENTS

| 2251936 | 5/1973 | Fed. Rep. of Germany. | |
| 0045793 | 3/1984 | Japan | 361/150 |
| 0134585 | 7/1985 | Japan | 361/150 |

OTHER PUBLICATIONS

IEEE Transaction on Broadcast & Television Receivers, Feb. 1972, vol. BTR-18, No. 1, "Degaussing Circuits for Color Television Receiver" by Blaha, p. 7.

Primary Examiner—A. D. Pellinen
Assistant Examiner—Jeffrey A. Gaffin
Attorney, Agent, or Firm—Ostrolenk, Faber, Gerb & Soffen

[57] ABSTRACT

A degaussing circuit for degaussing a cathode ray tube has a degaussing coil mounted on the back of the catode ray tube and a positive temperature coefficient thermistor connected in series with the degaussing coil. The resonance frequency determined by the degaussing coil and the positive temperature coefficient thermistor is set to be below about 14 kHz or above about 17 kHz.

11 Claims, 2 Drawing Sheets

DEGAUSSING CIRCUIT FOR CRT

BACKGROUND OF THE INVENTION

1. Field of the Invention

The present invention relates to a degaussing circuit for a CRT (cathode ray tube) used in a color television, a color monitoring device, a color display device, or the like.

2. Description of the Prior Art

Generally, although CRTs have shadow masks, there will be still some color shading observed due to an undesirable magnetic field, such as the earth's magnetic field, which affects the CRT. In order to eliminate the unwanted magnetic field, a degaussing circuit has been proposed which includes a degaussing coil with a positive temperature coefficient thermistor inserted with respect to the power source. The degaussing coil is usually provided by one loop wound on the back surface of the CRT, or by two loops provided on the upper half and lower half of the back surface of the large size CRT to increase the degaussing effect.

Generally, the positive temperature coefficient thermistor made of a material containing barium titanate has some capacitive component C, which is about 4-40 nF when measured during the high impedance stable condition obtained after the completion of the degaussing operation as effected immediately after the commencement of the power supply. Since the degaussing coil itself has an inductance of about 10-20 mH, the degaussing circuit defined by a combination of the positive temperature coefficient thermistor and the degaussing coil will have a resonance frequency ($fo = \frac{1}{2}\sqrt{LC}$) which sometimes takes a value of about 15-16 kHz. Since the horizontal scanning frequency of the deflecting yoke provided around the electron gun of the CRT is 15.75 kHz, the signal generated by the deflecting yoke may resonate with the signal through the degaussing coil such that the magnetic flux produced by the deflecting yoke links with the degaussing coil to generate induction current, which may undesirably rise to about 100 mA (normally several mA), in the degaussing coil, resulting in undesirable picture fluctuation even after the completion of the degaussing.

Although it is possible to prevent the degaussing coil from being adversely affected by the magnetic field produced by the deflecting yoke by providing a suitable shield, such a shield results in high manufacturing cost.

SUMMARY OF THE INVENTION

The present invention has been developed with a view to substantially solving the above described disadvantages and has for its essential object to provide an improved degaussing circuit which does not resonate with the horizontal scanning signal, and yet which is stable in operation, and simple in construction.

In accomplishing these and other objects, a degaussing circuit according to the present invention is so arranged that the resonance frequency determined by the degaussing coil and the positive temperature coefficient thermistor is set to be below about 14 kHz or above about 17 kHz.

BRIEF DESCRIPTION OF THE DRAWINGS

These and other objects and features of the present invention will become apparent from the following description of preferred embodiments thereof with reference to the accompanying drawings, throughout which like parts are designated by like reference numerals, and in which.

DETAILED DESCRIPTION OF THE PREFERRED EMBODIMENTS

Figure 1:
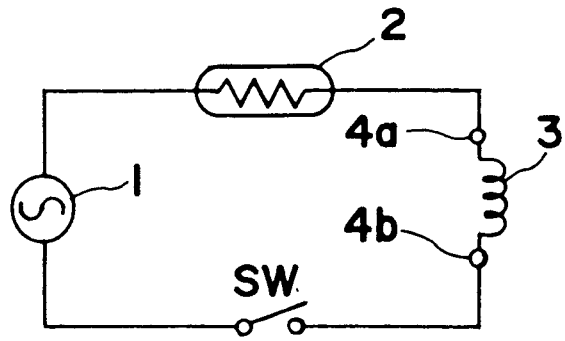
FIG. 1 is a circuit diagram of a degaussing circuit of the present invention.

Referring to FIG. 1, a degaussing circuit of the present invention is shown, which comprises a positive temperature coefficient (PTC) thermistor 2, a degaussing coil 3 and a main switch SW connected in series between the terminals of an AC power source 1.

Figure 3:
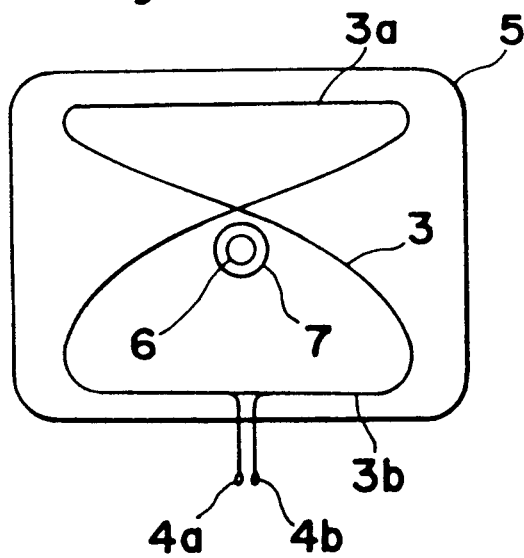
FIG. 3 is a diagrammatic view of the degaussing circuit of FIG. 1 applied to the CRT, when it is viewed from the back.
Figure 4:
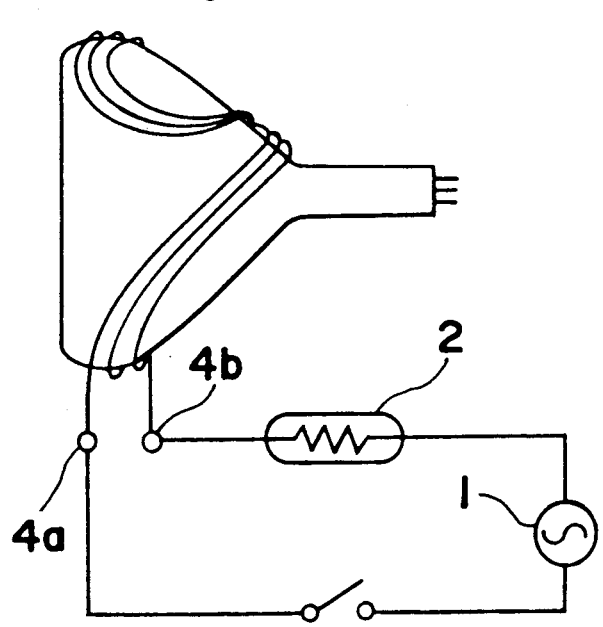
FIG. 4 is a diagrammatic view of the degaussing circuit of FIG. 1 applied to the CRT, when it is viewed from the side.

As shown in FIGS. 3 and 4, degaussing coil 3 is provided on a back conical side of a CRT (cathode ray tube) 5 such that a loop portion 3a is provided above an electron gun 6 and deflecting yoke 7 of CRT 5 and another loop portion 3b is provided below the loop 3a so as to include therein electron gun 6 and deflection yoke 7. Since CRT 5 is covered by two loops 3a and 3b, the degaussing can be done with a high efficiency.

In operation, when the main switch SW is turned on, a great amount of electric current flows through degaussing coil 3. Then, after a certain period of time, i.e., when the electric resistance of PTC thermistor 2 becomes high due to the temperature rise of the PTC thermistor itself, the current flowing through degaussing coil 3 will be decreased. By that time, the degaussing operation of various magnetic parts, such as a shadow mask, is completed. Thereafter, a very small amount of current I (referred to as the stable current), such as below several tens of milliamperes, should flow through degaussing coil 3, as will be described hereinbelow.

Figure 2:
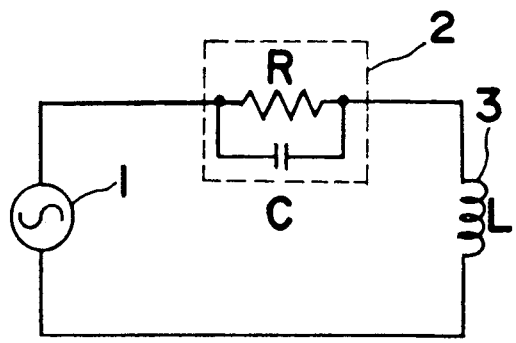
FIG. 2 is a circuit diagram of an equivalent circuit of the circuit shown in FIG. 1.

The resonance frequency fo of the degaussing circuit can be given by the following equation:

$$fo = \tfrac{1}{2}\pi \sqrt{LC}$$

in which C is a capacitive component of PTC thermistor 2 measured while it has gained a high resistance and L is an inductance of degaussing coil 3, as shown in FIG. 2.

Figure 5:
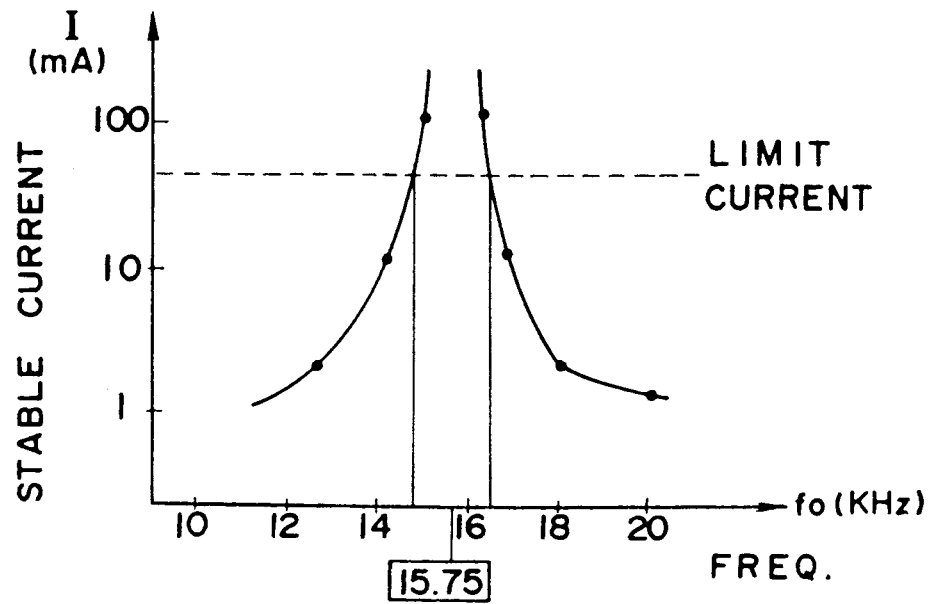
FIG. 5 is a graph showing a residual current through the circuit of FIG. 1 at the resonance frequency.

A relationship between the resonance frequency fo and the stable current I as measured when degaussing coil 3 is mounted on the back of CRT 5 is shown in FIG. 5. It has been observed that when the stable current I is greater than about 50 milliamperes (limit current), there will be an image fluctuation and/or horizontal stripes appear in the picture. Such increase of the stable current I is due to, as has been described above in connection with the prior art, the induction current generated in the degaussing circuit caused by the AC magnetic field (15.75 kHz) which is produced by the horizontal beam scan signal used in deflection yoke 7.

In the light of the above fact, according to the present invention, the degaussing circuit is so arranged that the resonance frequency fo thereof is offset from the horizontal scanning frequency (15.75 kH) of the deflecting yoke, preferably about or below 14 kHz, or about or above 17 kHz. By this arrangement, is it possible to maintain the stable current I below 50 milliamperes, i.e., below the limit current, such as to several milliamperes.

According to one example, since the inductance L of degaussing coil 3 is about 10-20 mH, the capacitive component C of PTC thermistor 2 is made to be about or below 4.5 nF or, about or above 10 nF by adjusting the structural factors thereof, such as composition, sintering conditions and/or crystal size (particle diameter) of the PTC thermistor 2. According to one embodiment, PTC thermistor 2 has a composition as given below.

(Ba 0.815 Sr 0.18 Y 0.005)TiO$_3$ + 0.05wt% Mn + 1.5wt% SiO$_2$

It is noted that as the capacitive component C of PTC thermistor 2 becomes great, a high frequency surge current from power source 1 will pass through the PTC thermistor 2, resulting in undesirable magnetization of various elements provided in the CRT 5. Thus, it is preferable to arrange the capacitive component C of PTC thermistor 2 to be below 4.5 nF.

Figure 6:
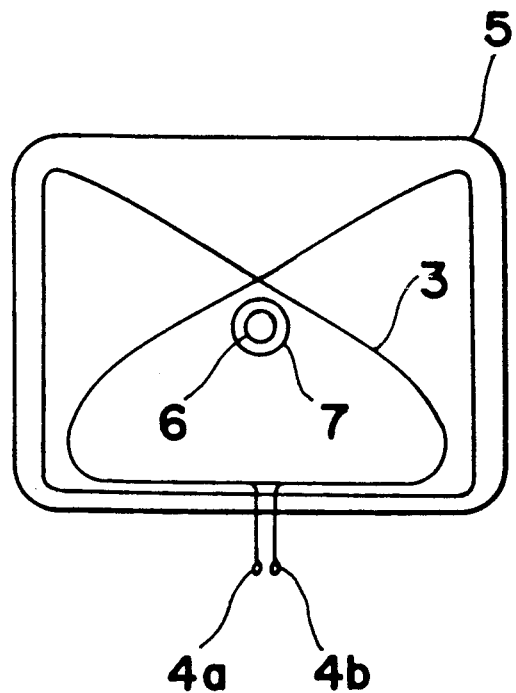
FIG. 6 is a view similar to FIG. 3, but showing a modification thereof.

It is to be noted that the manner in which degaussing coil 3 is mounted on CRT 5 can be varied such as a double loop, as shown in FIG. 6.

Figure 7:
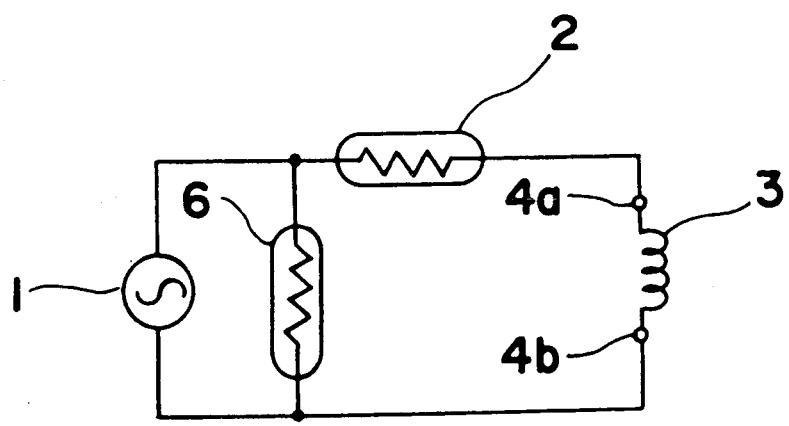
FIG. 7 is a view similar to FIG. 1, but showing a modification thereof.

Furthermore, as shown in FIG. 7, it is possible to connect another PTC thermistor 6 in parallel to the power source 1 and in a thermally coupled manner with PTC thermistor 2 so as to aid the heating up process of PTC thermistor 2.

According to the present invention, since the resonance frequency fo of the degaussing circuit is arranged to be about or below 14 kHz, or about or above 17 kHz so as to be offset from the frequency of the horizontal scanning signal used in the deflection yoke, the stable current obtained after the degaussing operation can be maintained below the limit current. Thus, no image fluctuation or horizontal stripes will appear in the picture.

Furthermore, since there is no fixed requirement of the capacitive component of the PTC thermistor, but can be varied about or below 4.5 nF or, about or above 10 nF, it is possible to easily design the degaussing circuit using various types of degaussing coil 3 having the inductance of about 10-20 mH.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A degaussing circuit for degaussing a cathode ray tube having a degaussing coil mounted on a back of said cathode ray tube and a positive temperature coefficient thermistor connected in series with said degaussing coil;

said series connection of said degaussing coil and PTC thermistor being connected across a low-frequency AC line supply so that a degaussing current having said low frequency of said AC line supply passes through said degaussing coil;

wherein the degaussing coil has an inductance and the thermistor has a capacitance; and wherein a resonance frequency determined by the inductance of said degaussing coil and the capacitance of said positive temperature coefficient thermistor is below substantially 14 kHz.

2. A degaussing circuit as claimed in claim 1, wherein said positive temperature coefficient thermistor has a capacitance of above about 10 nF.

3. A degaussing circuit as claimed in claim 2, wherein said degaussing coil has an inductance of about 10-20 mH.

4. A degaussing circuit as claimed in claim 1, wherein said degaussing circuit includes a second positive temperature coefficient thermistor connected across the above-mentioned series connection of said degaussing coil and thermistor;

wherein said second thermistor has a second capacitance; and wherein a resonance frequency determined by the inductance of said degaussing coil and the capacitance of both said positive temperature coefficient thermistors is below substantially 14 kHz.

5. A degaussing circuit for degaussing a cathode ray tube having a degaussing coil mounted on a back of said cathode ray tube and a positive temperature coefficient thermistor connected in series with said degaussing coil;

wherein the degaussing coil has an inductance and the thermistor has a capacitance; and wherein a resonance frequency determined by the inductance of said degaussing coil and the capacitance of said positive temperature coefficient thermistor is above substantially 17 kHz.

6. A degaussing circuit as claimed in claim 5, wherein said positive temperature coefficient thermistor has a capacitance of below about 4.5 nF.

7. A degaussing circuit as claimed in claim 6, wherein said degaussing coil has an inductance of about 10-20 mH.

8. A degaussing circuit as claimed in claim 5, wherein said degaussing circuit includes a second positive temperature coefficient thermistor connected across the above-mentioned series connection of said degaussing coil and thermistor;

wherein said second thermistor has a second capacitance; and wherein a resonance frequency determined by the inductance of said degaussing coil and the capacitance of both said positive temperature coefficient thermistors is above substantially 17 kHz.

9. In a video display device including a cathode ray tube with a deflection yoke to which a deflection signal is supplied, a degaussing circuit for degaussing the cathode ray tube, said circuit including a degaussing coil mounted on a back of said cathode ray tube and a positive temperature coefficient thermistor connected in series with said degaussing coil;

wherein the degaussing coil has an inductance and the thermistor has a capacitance; and wherein a resonance frequency determined by the inductance of said degaussing coil and the capacitance of said positive temperature coefficient thermistor is substantially offset from a frequency of the deflection signal supplied to the deflection yoke.

10. A degaussing circuit as claimed in claim 9, wherein said deflection frequency is substantially 15.75 kHz and said resonance frequency is below substantially 14 kHz.

11. A degaussing circuit as claimed in claim 9, wherein said deflection frequency is substantially 15.75 kHz and said resonance frequency is above substantnally 17 kHz.

* * * * *